United States Patent
Hirata et al.

(10) Patent No.: US 11,290,841 B2
(45) Date of Patent: Mar. 29, 2022

(54) INFORMATION PROCESSING APPARATUS, INFORMATION PROCESSING METHOD, DATA COLLECTION DEVICE, AND CONTROL METHOD

(71) Applicant: NEC CORPORATION, Tokyo (JP)

(72) Inventors: Kyoji Hirata, Tokyo (JP); Akira Kamei, Tokyo (JP); Yumiko Okuyama, Tokyo (JP); Toru Yamada, Tokyo (JP); Masahiro Serizawa, Tokyo (JP); Masashi Shimoma, Tokyo (JP); Satoshi Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 69 days.

(21) Appl. No.: 16/483,284

(22) PCT Filed: Dec. 11, 2017

(86) PCT No.: PCT/JP2017/044452
§ 371 (c)(1),
(2) Date: Aug. 2, 2019

(87) PCT Pub. No.: WO2018/142774
PCT Pub. Date: Aug. 9, 2018

(65) Prior Publication Data
US 2019/0357006 A1    Nov. 21, 2019

(30) Foreign Application Priority Data

Feb. 3, 2017 (JP) .............................. JP2017-018829

(51) Int. Cl.
*H04W 4/021* (2018.01)
*H04L 29/08* (2006.01)
(Continued)

(52) U.S. Cl.
CPC ........... *H04W 4/021* (2013.01); *H04L 67/303* (2013.01); *H04M 3/487* (2013.01); *H04M 11/06* (2013.01); *H04W 48/16* (2013.01)

(58) Field of Classification Search
CPC .... H04W 4/021; H04W 48/16; H04L 67/303; H04M 11/06; H04M 3/487
See application file for complete search history.

(56) References Cited

U.S. PATENT DOCUMENTS 9,813,965 B1 * 11/2017 Edara .................... H04W 36/30
2017/0244472 A1 * 8/2017 Saito ...................... H04B 7/155
(Continued)

FOREIGN PATENT DOCUMENTS

| JP | 2008-79226 A  | 4/2008 |
| JP | 2009-159457 A | 7/2009 |

(Continued)

OTHER PUBLICATIONS

3GPP TS 23.303 V14.1.0, 3rd Generation Partnership Project; Technical Specification Group Services and System Aspects; Proximity-based services (ProSe); Stage 2 (Release 14), Dec. 2016, 15 Pages.
(Continued)

*Primary Examiner* — Elton Williams
(74) *Attorney, Agent, or Firm* — Sughrue Mion, PLLC

(57) ABSTRACT

Disclosed is an information processing apparatus for reducing the waste of power consumption in an IoT system, comprising a position information obtainer that periodically obtains position information of a data collection device, and position information of a relay device that relays communication between the data collection device and a base station, and a controller that controls measurement of a signal strength between the data collection device and the
(Continued)

| CONDITION | MEASUREMENT |
|---|---|
| DISTANCE BETWEEN DEVICE AND RELAY IS EQUAL TO OR SMALLER THAN THRESHOLD | STOP |
| DISTANCE BETWEEN DEVICE AND RELAY IS LARGER THAN THRESHOLD | START |
| DEVICE IS IN TRAIN | STOP |
| DEVICE IS IN AUTOMOBILE | STOP |
| DEVICE IS IN ONE'S HOUSE | STOP |
| DEVICE IS MOVING AT PREDETERMINED SPEED OR HIGHER | START | relay device, based on the position information of the data collection device and the position information of the relay device.

9 Claims, 12 Drawing Sheets

(51) Int. Cl.
  *H04M 3/487* (2006.01)
  *H04M 11/06* (2006.01)
  *H04W 48/16* (2009.01)
  *H04L 67/303* (2022.01)

(56) References Cited

U.S. PATENT DOCUMENTS

2018/0156925 A1* 6/2018 Johns .................... H04W 4/021
2019/0320358 A1* 10/2019 Knapp .............. H04W 52/0209

FOREIGN PATENT DOCUMENTS

| JP | 2012-191443 A | 10/2012 |
| JP | 2012-209744 A | 10/2012 |
| JP | 2015-87356 A | 5/2015 |

OTHER PUBLICATIONS

International Search Report for PCT/JP2017/044452 dated Jan. 23, 2018 [PCT/ISA/210].

* cited by examiner

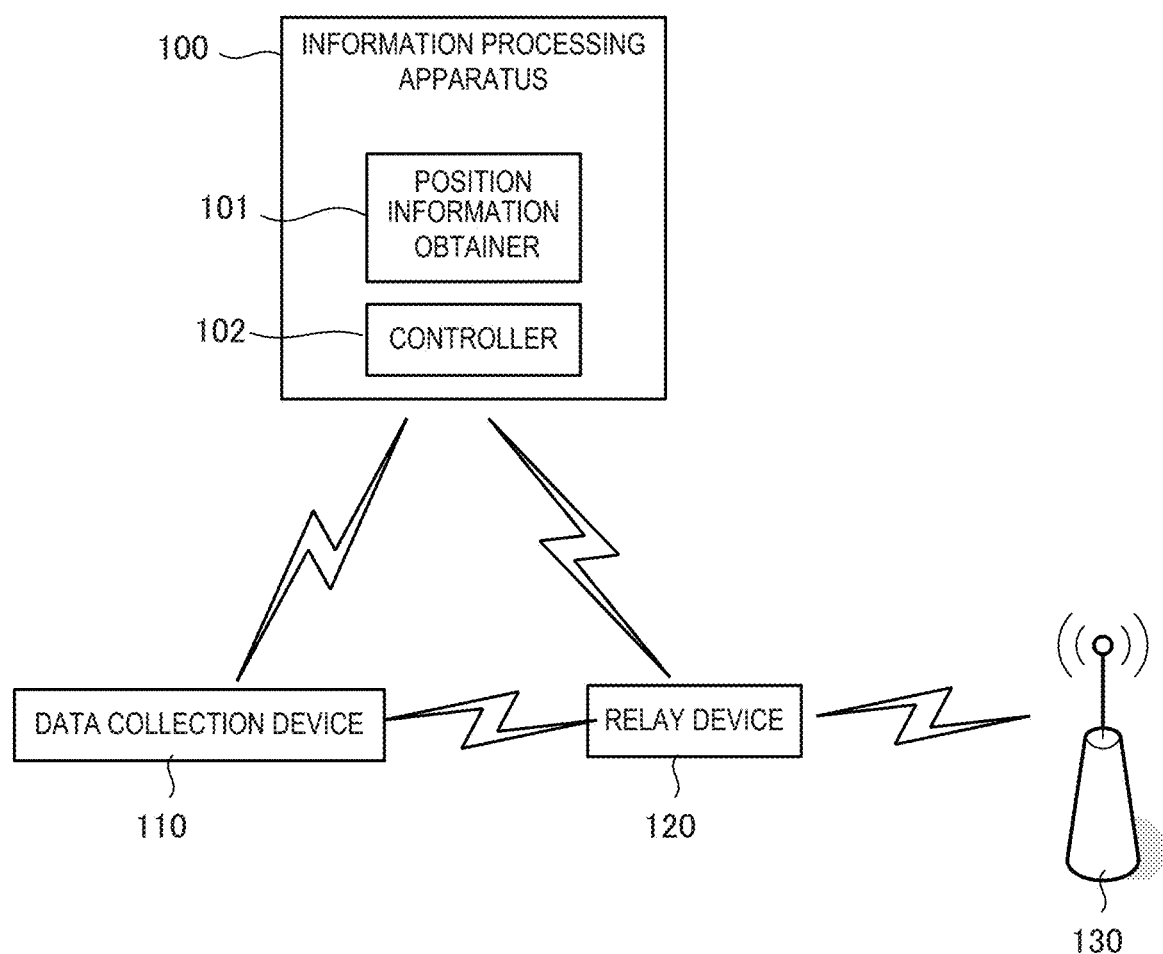
F I G. 1

900

| CONDITION | MEASUREMENT |
|---|---|
| DISTANCE BETWEEN DEVICE AND RELAY IS EQUAL TO OR SMALLER THAN THRESHOLD | STOP |
| DISTANCE BETWEEN DEVICE AND RELAY IS LARGER THAN THRESHOLD | START |
| DEVICE IS IN TRAIN | STOP |
| DEVICE IS IN AUTOMOBILE | STOP |
| DEVICE IS IN ONE'S HOUSE | STOP |
| DEVICE IS MOVING AT PREDETERMINED SPEED OR HIGHER | START |

FIG. 9

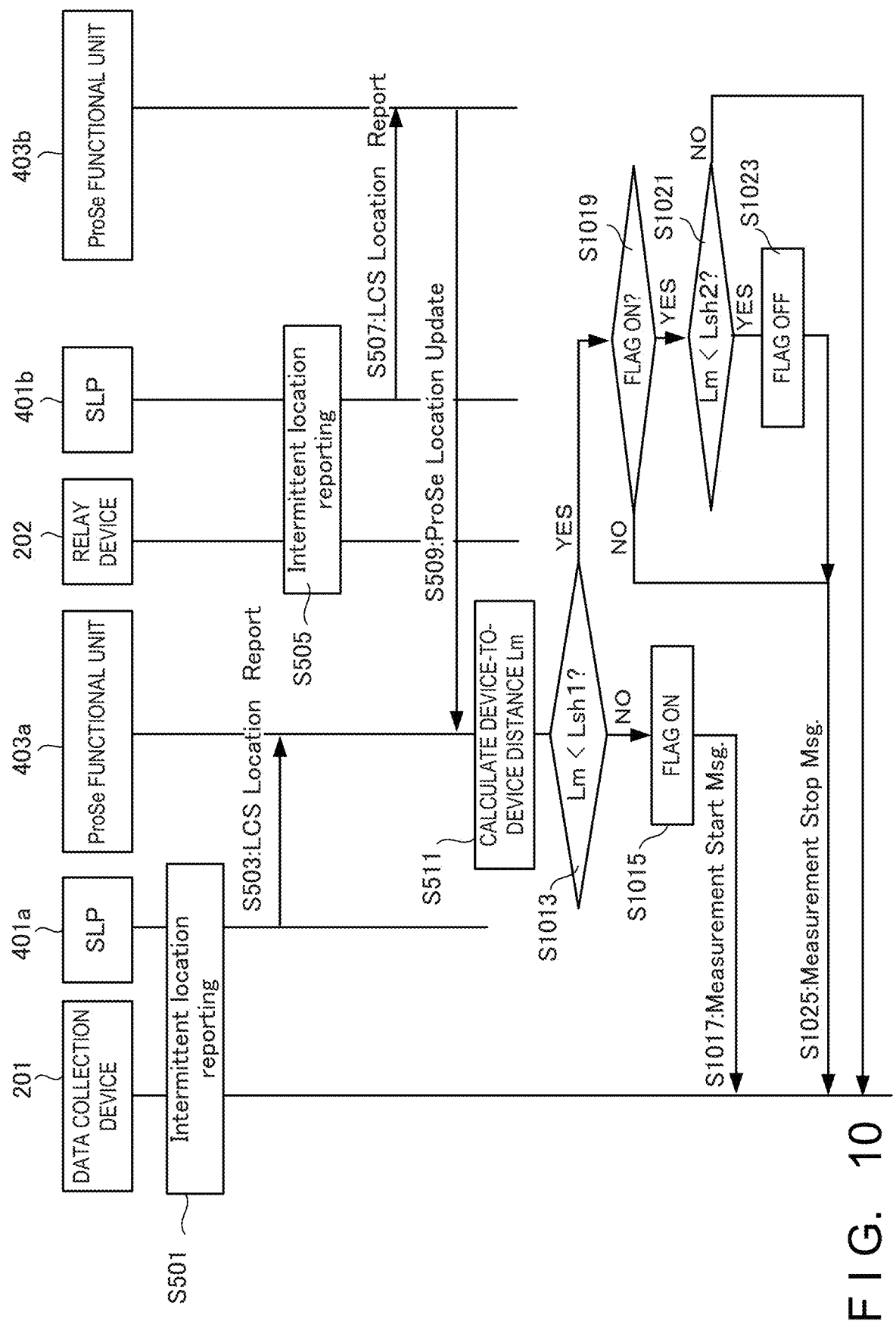
F I G. 10

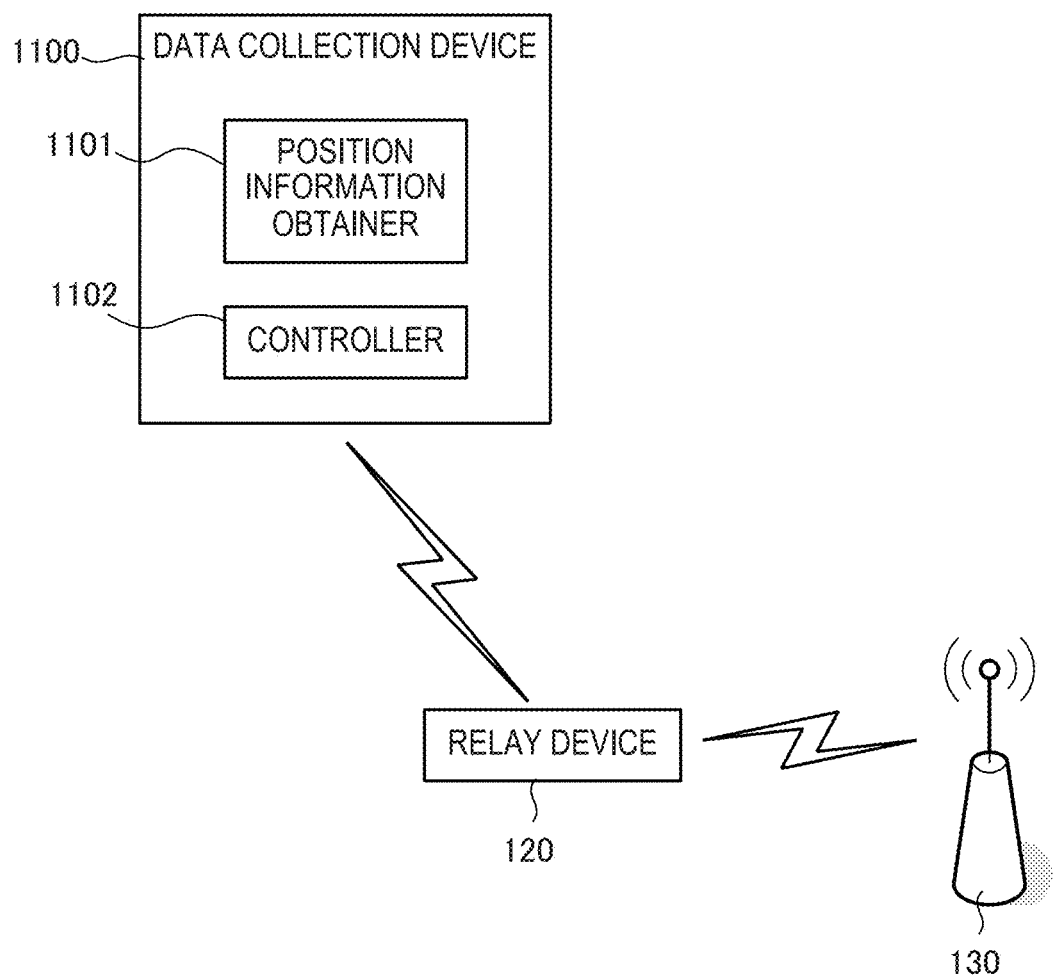
F I G. 11

INFORMATION PROCESSING APPARATUS, INFORMATION PROCESSING METHOD, DATA COLLECTION DEVICE, AND CONTROL METHOD

CROSS REFERENCE TO RELATED APPLICATIONS

This application is a National Stage of International Application No. PCT/JP2017/044452, filed on Dec. 11, 2017, which claims priority from Japanese Patent Application No. 2017-018829, filed on Feb. 3, 2017.

This application is based upon and claims the benefit of priority from Japanese patent application No. 2017-018829, filed on Feb. 3, 2017, the disclosure of which is incorporated herein in its entirety by reference.

TECHNICAL FIELD

The present invention relates to an information processing apparatus, an information processing method, a data collection device, and a control method.

BACKGROUND ART

In the abovementioned technical field, non-patent literature 1 discloses a method of transmitting data obtained by an IoT (Internet of Things) remote device (Remote User Equipment) to a base station (eNB) via a relay device (UE-to-Network Relay device). In particular, 4.4.3 ProSe UE-to-Network Relay for Public Safety of non-patent literature 1 discloses a form in which the remote device exchanges data with an MTC (Machine Type Communication) server by using ProSe (Proximity-based services: a terminal-to-terminal direct communication function), in addition to long-range communication such as LTE (Long Term Evolution).

CITATION LIST

Patent Literature

Non-Patent literature 1: 3GPP TR 23.303 V14.1.0 (2016-12)

SUMMARY OF THE INVENTION

Technical Problem

In the technique described in the above literature, however, the measurement timings of the signal strength from the relay device cannot be reduced, and this wastes the power consumption of the remote device.

The present invention enables to provide a technique of solving the above-described problem.

Solution to Problem

One example aspect of the present invention provides an apparatus comprising
a position information obtainer that periodically obtains position information of a data collection device, and position information of a relay device that relays communication between the data collection device and a base station, and
a controller that controls measurement of a signal strength between the data collection device and the relay device, based on the position information of the data collection device and the position information of the relay device.

Another example aspect of the present invention provides a method comprising
periodically obtaining position information of a data collection device, and position information of a relay device that relays communication between the data collection device and a base station, and
controlling measurement of a signal strength between the data collection device and the relay device, based on the position information of the data collection device and the position information of the relay device.

Still other example aspect of the present invention provides a program for causing a computer to execute a method, comprising
periodically obtaining position information of a data collection device, and position information of a relay device that relays communication between the data collection device and a base station, and
controlling measurement of a signal strength between the data collection device and the relay device, based on the position information of the data collection device and the position information of the relay device.

Still other example aspect of the present invention provides a data collection device comprising
a position information obtainer that periodically obtains position information of the data collection device, and position information of a relay device that relays communication between the data collection device and a base station, and
a controller that controls measurement of a signal strength between the data collection device and the relay device, based on the position information of the data collection device and the position information of the relay device.

Still other example aspect of the present invention provides a data collection device control method comprising
periodically obtaining position information of a data collection device, and position information of a relay device that relays communication between the data collection device and a base station, and
controlling measurement of a signal strength between the data collection device and the relay device, based on the position information of the data collection device and the position information of the relay device.

Still other example aspect of the present invention provides a data collection device control program for causing a computer to execute a method, comprising
periodically obtaining position information of a data collection device, and position information of a relay device that relays communication between the data collection device and a base station, and
controlling measurement of a signal strength between the data collection device and the relay device, based on the position information of the data collection device and the position information of the relay device.

Advantageous Effects of Invention

The present invention can reduce the waste of power consumption in an IoT system.

BRIEF DESCRIPTION OF DRAWINGS

FIG. 1 is a block diagram showing the arrangement of an information processing apparatus according to the first example embodiment of the present invention;

FIG. 9 is a view showing a table to be used in the information processing system according to the second example embodiment of the present invention; and FIG. 10 is a sequence chart showing the procedure of an information processing system according to the third example embodiment of the present invention.

FIG. 11 is a view showing the configuration of an information processing system 1100 according to this example embodiment;

DESCRIPTION OF THE EXAMPLE EMBODIMENTS

Figure 2:
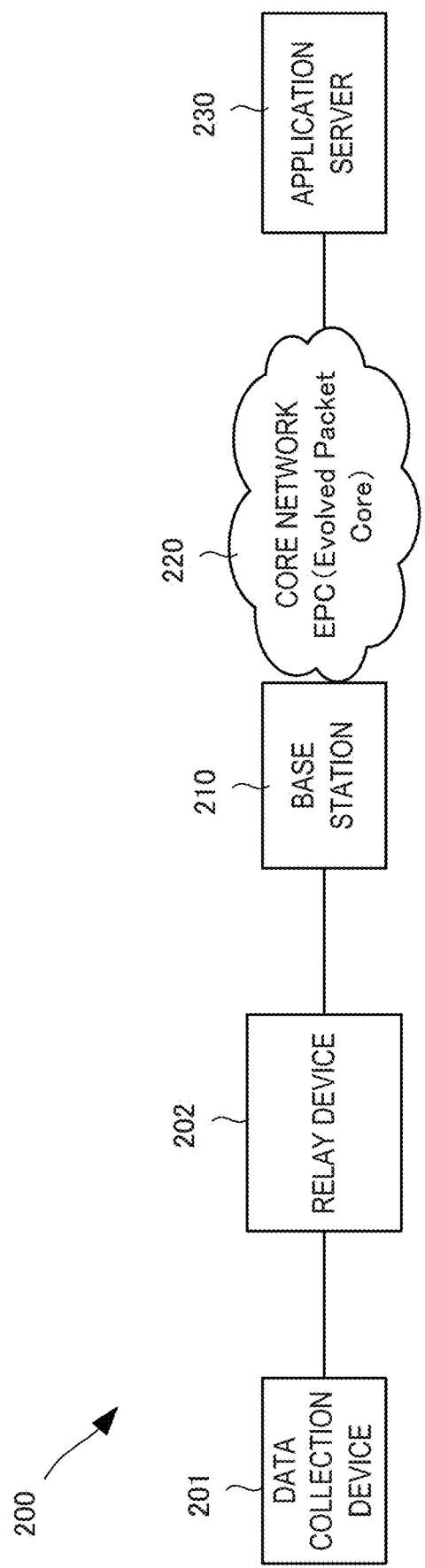
FIG. 2 is a block diagram showing an outline of the configuration of an information processing system according to the second example embodiment of the present invention.

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

An information processing apparatus 100 as the first example embodiment of the present invention will be explained with reference to FIG. 1. The information processing apparatus 100 includes a position information obtainer 101 and a controller 102.

The position information obtainer 101 periodically obtains position information of a data collection device 110, and position information of a relay device 120 that relays communication between the data collection device 110 and a base station 130.

The controller 102 controls the measurement of the signal strength between the data collection device 110 and the relay device 120, based on the position information of the data collection device 110 and the position information of the relay device 120. "Controls the measurement of the signal strength" includes at least "terminating (stopping, interrupting) the measurement" and "dropping (suppressing) the measurement frequency".

When the data collection device 110 and the relay device 120 exist at a distance shorter than a predetermined value, it is estimated that the change in signal strength is small, so no problem arises even if the measurement process is temporarily omitted. In this example embodiment, therefore, based on the position information of the data collection device 110 and the position information of the relay device 120, it is possible to omit the process of measuring the signal strength between them, and reduce the waste of power consumption of the data collection device 110 or the relay device 120.

Second Example Embodiment

Next, an information processing system 200 according to the second example embodiment of the present invention will be explained with reference to the drawings from FIG. 2. FIG. 2 is a view for explaining the overall configuration of the information processing system 200 according to this example embodiment.

The information processing system 200 includes a data collection device (Remote UE) 201, a relay device 202, a base station 210, a core network 220, and an application server 230. FIG. 2 shows only one data collection device, but the present invention is not limited to this, and two or more data collection devices can be included.

The data collection device 201 transmits obtained data in response to a request from the application server 230. That is, the data collection device 201 transmits the data to the application server 230 via the base station 210 by using a wireless network that can be used by a subscriber contract.

The relay device 202 relays communication between the data collection device 201 and the base station 210. More specifically, the distance between the data collection device 201 and the relay device 202 is sufficiently short, so it is possible to use device-to-device (D2D) direct communication (ProSe: Proximity-based Services) that is defined by 3GPP TS 23.303 and does not use the base station 210, or short-range wireless communication such as Bluetooth®. Since the relay device 202 establishes communication with the base station 210, the data collection device 201 need not directly communicate with the base station 210 and hence can be arranged outside the coverage of the base station 210.

The core network 220 includes MME (Mobility Management Entity) for handling C-plane (Control plane) for network control, G-GW (Serving Gateway) for handling U-plane (User plane) as packet data of user data, and P-GW (PDN: Packet data network Gateway) for connecting to an external network such as the Internet. The MME is an access gateway for handling network control, and performs a sequence control function, a handover control function, position management when the terminal is standing by, an incoming calling (paging) function for the base station, a terminal authentication managing function, and the like. The S-GW is a gateway for handling user data, and has a node function for connecting user data of LTE to a 2G or 3G system. The P-GW is a gateway for connecting to the Internet, an intranet of an enterprise, and the like, and includes a function of managing user data when moving the terminal between LTE and non-LTE, a charging data collecting function such as counting of packets used by the user, a QoS control function, and a packet filtering function.

Figure 3:
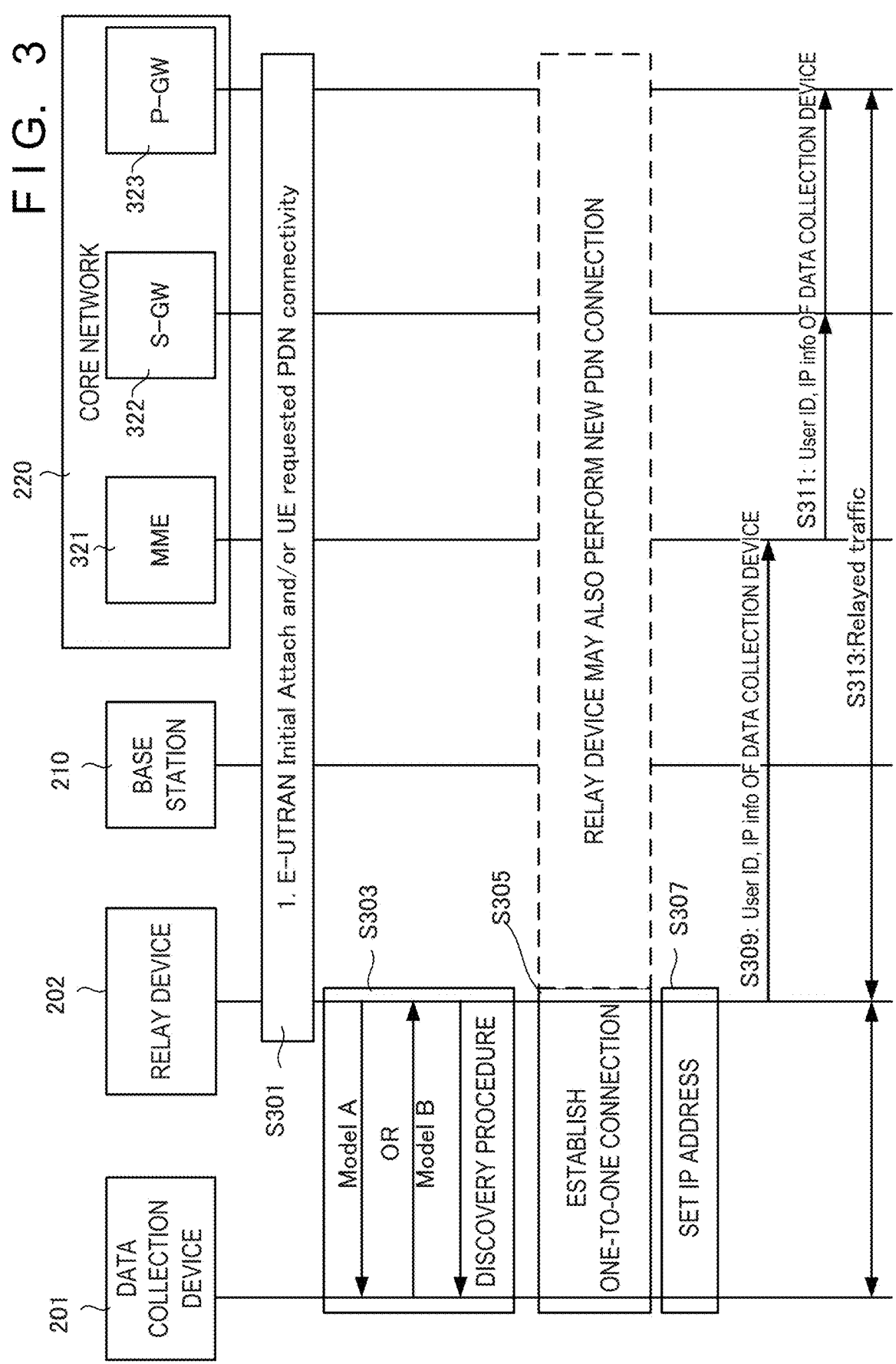
FIG. 3 is a sequence chart showing the procedure of the information processing system according to the second example embodiment of the present invention.

FIG. 3 is a view showing an outline of the procedure of establishing connection between the data collection device 201 and the relay device 202.

In step S301, the relay device 202 accesses the base station 210 and establishes connection to a PDN (Packet Data Network). In step S303, the data collection device 201 searches for the relay device 202 by using a Model-A or Model-B discovery procedure. In step S305, the data collection device 201 measures the signal strength of a discovery message transmitted from the relay device 202, selects the relay device 202 having a signal strength equal to or larger than a predetermined value, and establishes connection.

In step S307, the relay device 202 sets the IP address of the data collection device 201.

In step S309, the relay device 202 reports the ID and IP information of the data collection device 201 to an MME 321. In step S311, the MME 321 reports the ID and IP information of the data collection device 201 to an S-GW 322 and a P-GW 323.

In step S313, a relay traffic is exchanged between the data collection device 201 and the P-GW 323.

Even after the connection is established by using the relay device 202, the data collection device 201 continues the measurement of the signal strength of the discovery message transmitted from the relay device 202, in order to reselect the relay device 202. In this example embodiment, in order to suppress power consumption by this signal strength measurement, the signal strength measurement timing is controlled in accordance with the distance between the data collection device 201 and the relay device 202.

Figure 4:
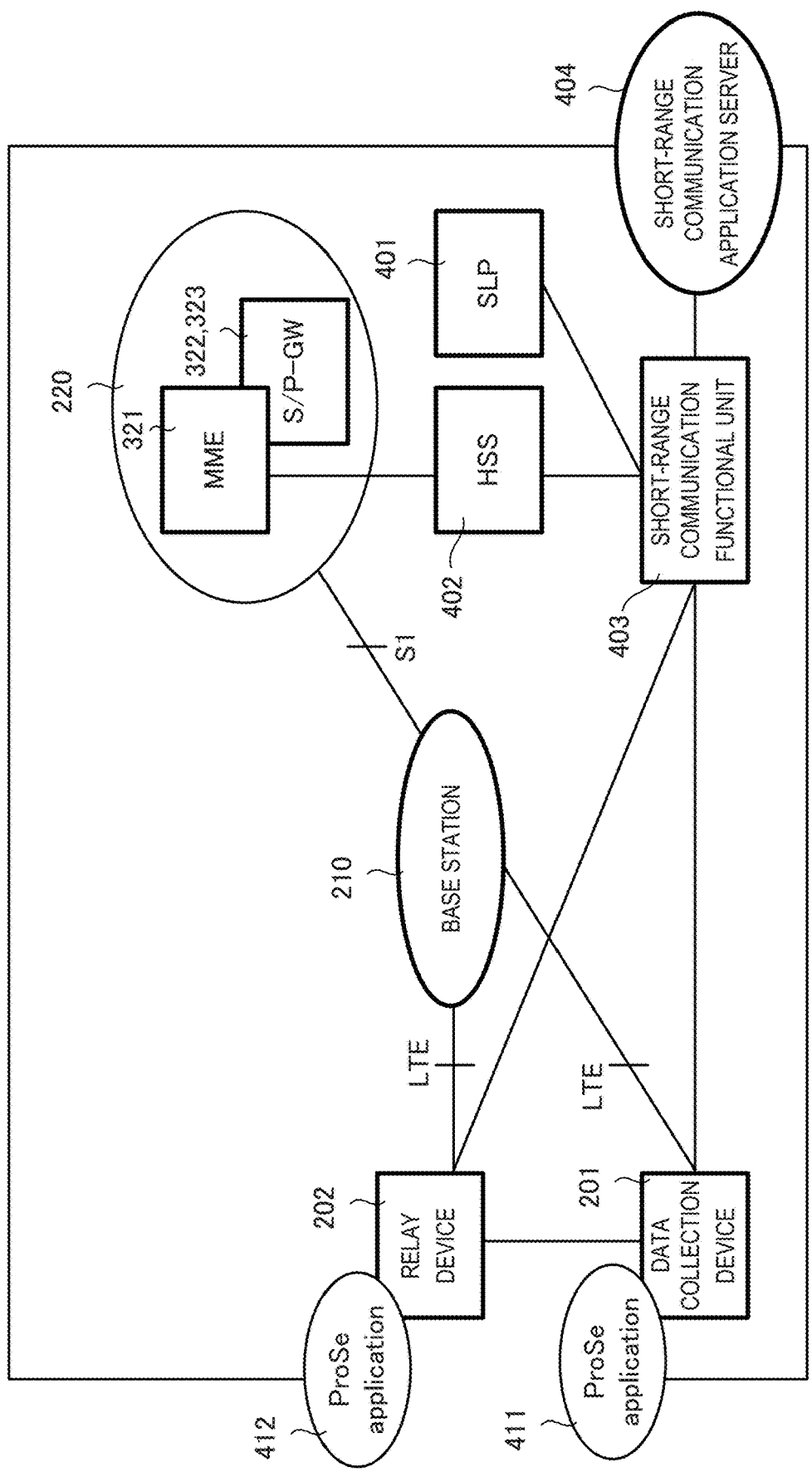
FIG. 4 is a block diagram showing details of the configuration of the information processing system according to the second example embodiment of the present invention.

FIG. 4 is a view for explaining details of the configuration of the information processing system 200 according to this example embodiment. The data collection device 201 communicates with the base station 210 by an LTE protocol either directly or via the relay device 202. The data collection device 201 and the relay device 202 respectively include short-range communication applications (ProSe Applications) 411 and 412, and perform short-range communication between them.

The data collection device 201 and the relay device 202 are connected to an SLP (Secure User Plane Location Platform) 401 via a short-range communication functional unit (ProSe Function) 403, and the SLP 401 collects position information of each of the data collection device 201 and the relay device 202. The SLP 401 transmits the collected position information to a short-range communication application server 404.

Based on the position information obtained from the SLP 401, the short-range communication application server 404 calculates the distance between the data collection device 201 and the relay device 202. If the distance between the data collection device 201 and the relay device 202 is equal to or smaller than a predetermined value, the short-range communication application server 404 instructs the data collection device 201 to interrupt the measurement of the signal strength between the data collection device 201 and the relay device 202. If the distance between the data collection device 201 and the relay device 202 is larger than the predetermined value, the short-range communication application server 404 instructs the data collection device 201 to start the measurement of the signal strength between the data collection device 201 and the relay device 202.

FIG. 4 shows only one data collection device 201 for the relay device 202, but the present invention is not limited to this, and one relay device can relay data from a plurality of data collection devices 201.

The short-range communication application server 404 further has the following functions.

Store the ProSe user ID, the ProSe function ID, the ProSe discovery device ID, and metadata Perform mapping of the application layer user ID and the ProSe user ID Perform mapping for ProSe direct discovery for which RPAUID (Restricted ProSe Application User ID) and PDUID (ProSe Discovery UE ID: the device ID of ProSe discovery) are restricted Hold permission information for restricted ProSe direct discovery by using the RPAUID Allocate ProSe restricted code suffix spools when using restricted direct discovery accompanied by application control extension Allocate ProSe restricted code suffix masks when using restricted direct discovery accompanied by application control extension The MME 321 has the following functions.

Receive user information about the short-range communication functional unit 403 from an HSS (Home Subscriber Server) 402

Notify the base station that the data collection device 201 is permitted to use short-range communication Hold a list of data collection devices 201 to be relayed by the relay device 202

The S-GW 322 has the following functions.

Receive information about the relay device 202 from the MME 321

Hold a list of data collection devices 201 to be relayed by the relay device 202 for each PDN Transfer information of the relay device 202 to the P-GW 323

The P-GW 323 has the following functions.

Receive information about the relay device 202 from the S-GW 322

Figure 5:
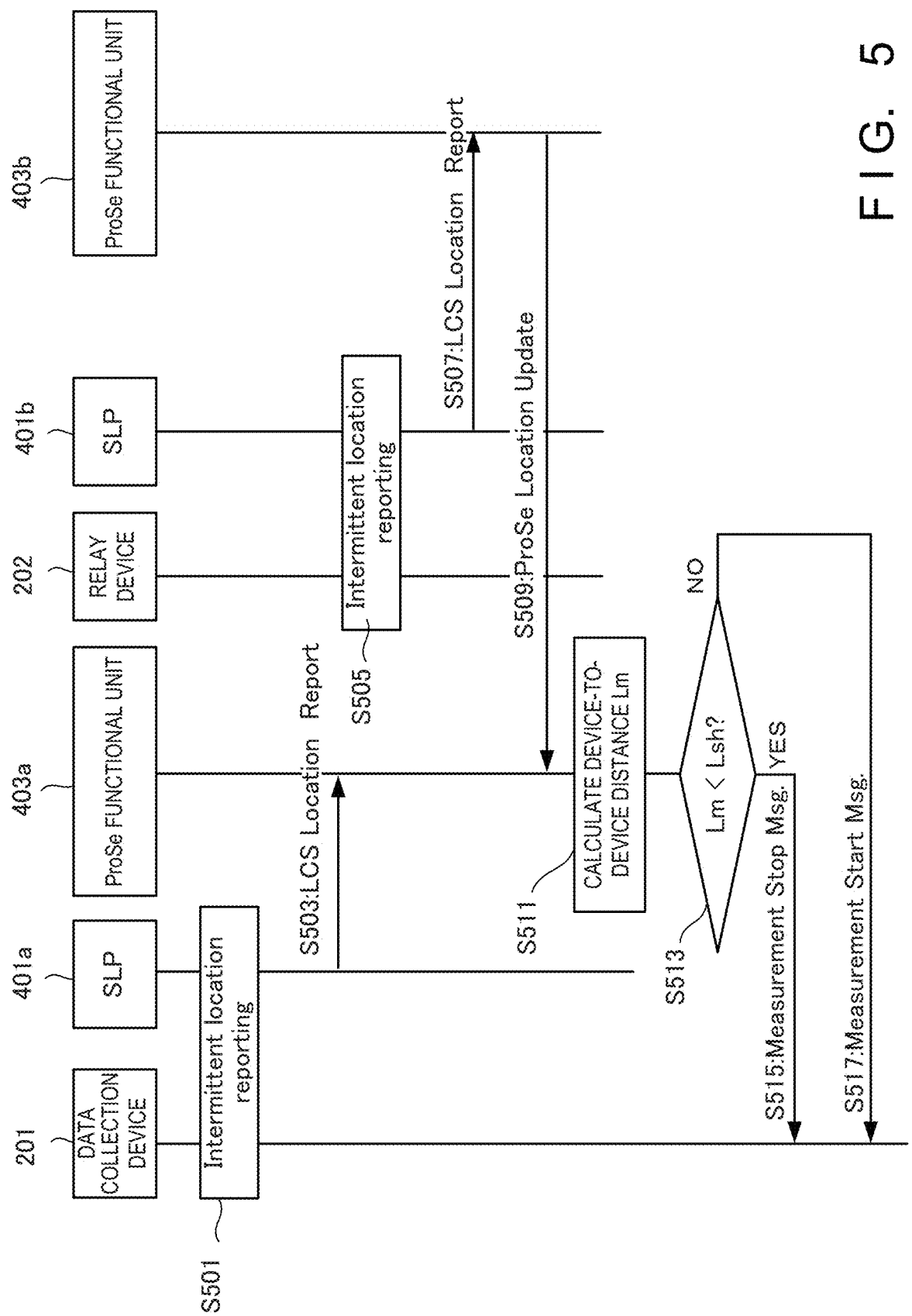
FIG. 5 is a sequence chart showing the procedure of the information processing system according to the second example embodiment of the present invention.

Hold a list of data collection devices 201 to be relayed by the relay device 202 for each PDN Exchange of position information in the system will be explained below with reference to FIG. 5.

In step S501, an SLP 401a receives a position information report from the data collection device 201 either periodically or in response to a request from a ProSe functional unit 403a. In step S503, the SLP 401a reports LCS position information to the ProSe functional unit 403a.

In step S505, an SLP 401b receives a position information report from the relay device 202 either periodically or in response to a request from a ProSe functional unit 403b. In step S507, the SLP 401b reports LCS position information to the ProSe functional unit 403b.

In step S509, the ProSe functional unit 403b transfers the position information of the relay device 202 to the ProSe functional unit 403a at a timing predetermined by the ProSe functional unit 403a.

The ProSe functional unit 403a calculates a device-to-device distance Lm (the distance between the data collection device 201 and the relay device 202) in step S511, and compares the distance Lm with a threshold Lsh in step S513.

If the device-to-device distance Lm is smaller than the threshold Lsh, the ProSe functional unit 403a instructs the data collection device 201 to stop measuring the signal strength from the relay device 202 (step S515).

If the device-to-device distance Lm is equal to or larger than the threshold Lsh, the ProSe functional unit 403a instructs the data collection device 201 to start measuring the signal strength from the relay device 202 (step S517).

Note that the ProSe functional unit 403a as a position information obtainer may also change the position information obtaining interval in accordance with the distance between the data collection device 201 and the relay device 202. For example, the position information obtaining interval can be increased if the data collection device 201 and the relay device 202 are sufficiently close and it can be determined that the distance does not increase for some time.

Figure 6:
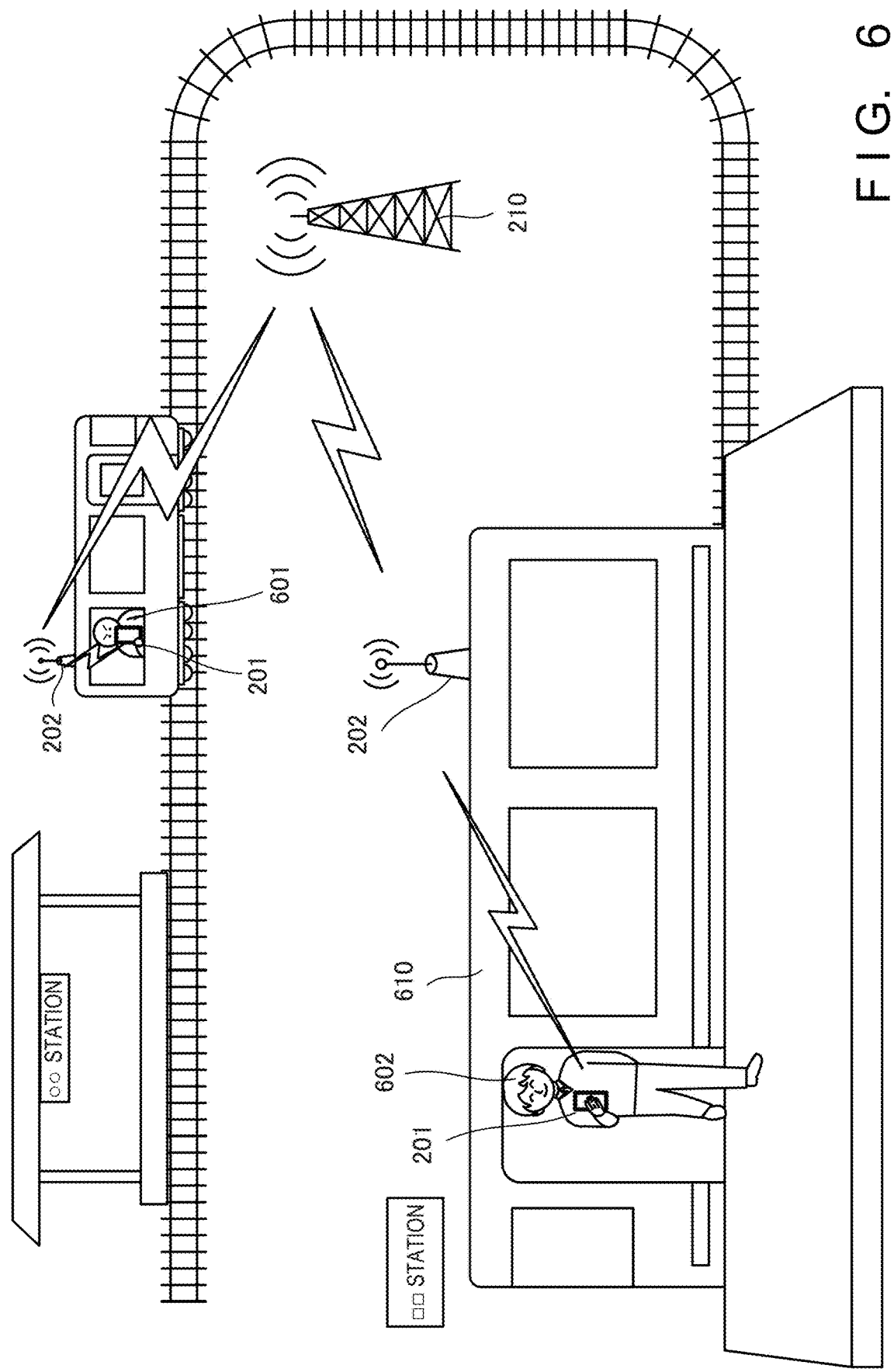
FIG. 6 is a view showing a scene in which the information processing system according to the second example embodiment of the present invention is used.

FIG. 6 is a view showing an example of a situation in which this example embodiment is implemented. Assume that a smartphone as the data collection device 201 owned by a user 601 exists in a train 610, the relay device 202 is installed on the train car. If the SLP 401 determines by position measurement that the data collection device 201 and the relay device 202 exist within a predetermined distance, the ProSe functional unit 403 instructs the data collection device 201 to stop measuring the signal strength from the relay device 202 for a predetermined period. The SLP 401 and the ProSe functional unit 403 are spaced apart from a plurality of base stations at a predetermined distance, and in many cases installed in a core network (physically, in a packet exchange station) wiredly connected by backhaul lines such as optical lines.

On the other hand, if the SLP 401 determines by position measurement that a user 602 gets off the train 610 and the distance between the data collection device 201 and the relay device 202 becomes larger than a predetermined value, the ProSe functional unit 403 instructs the data collection device 201 to start measuring the signal strength from the relay device 202.

Figure 7:
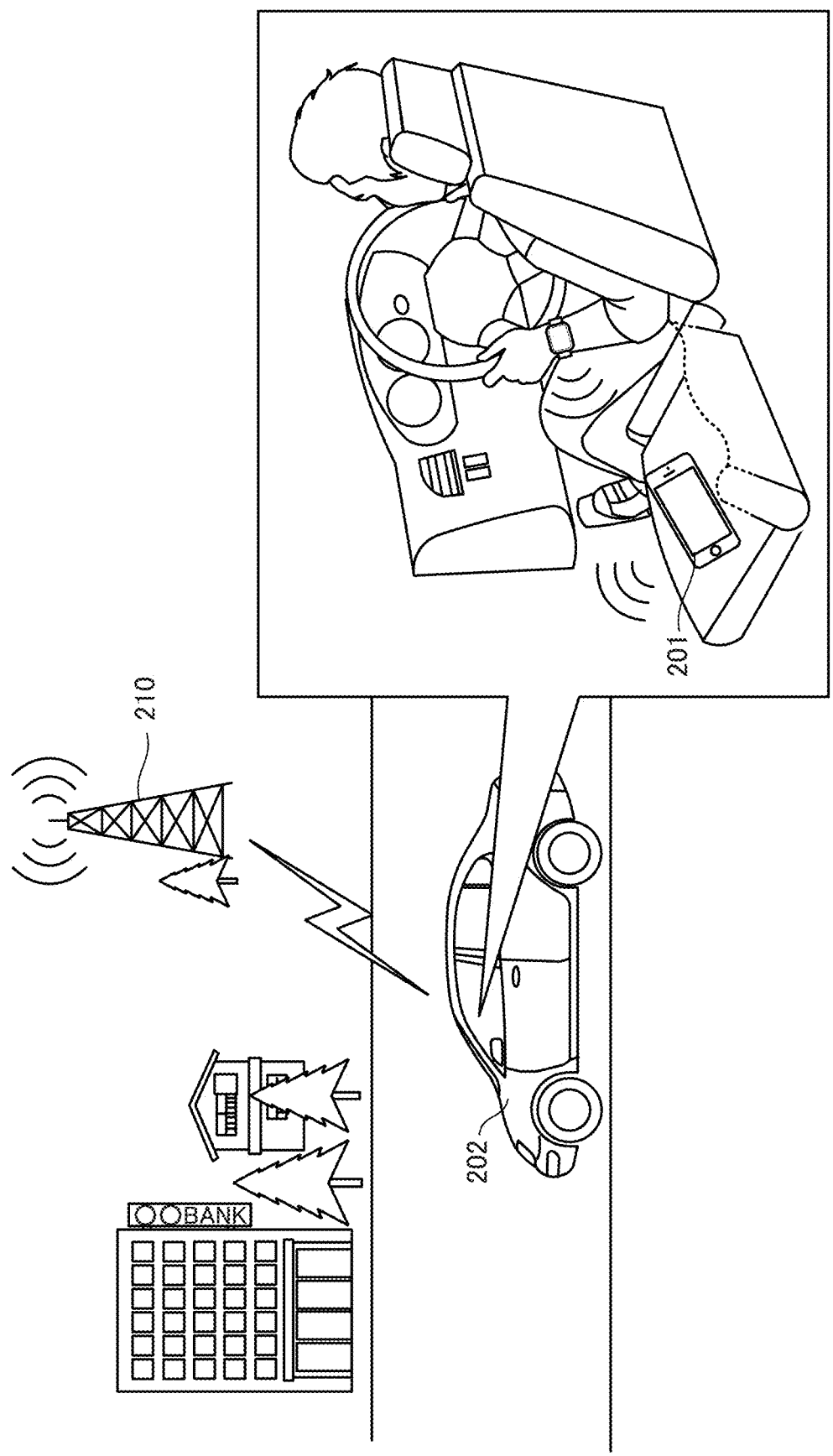
FIG. 7 is a view showing a scene in which the information processing system according to the second example embodiment of the present invention is used.
Figure 8:
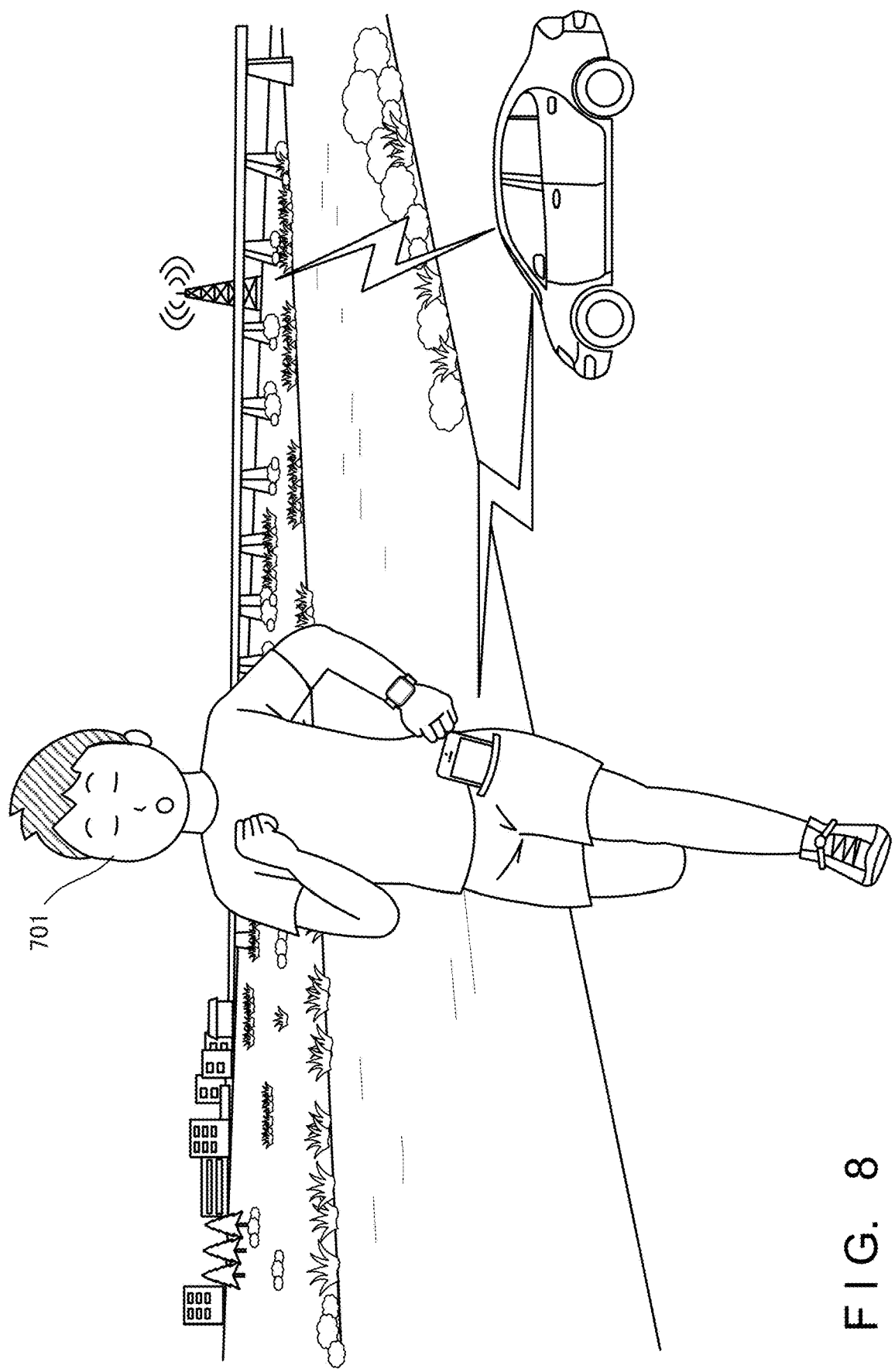
FIG. 8 is a view showing a scene in which the information processing system according to the second example embodiment of the present invention is used.

FIGS. 7 and 8 are views showing other examples of the situation in which this example embodiment is implemented. Assume that a user 701 owns a smartphone as the data collection device 201 and a private automobile includes the relay device 202. As shown in FIG. 7, during driving or the like, if the SLP 401 determines by position measurement that the data collection device 201 and the relay device 202 exist within a predetermined distance, the ProSe functional unit 403 instructs the data collection device 201 to stop measuring the signal strength from the relay device 202 for a predetermined period.

On the other hand, as shown in FIG. 8, if the user 701 starts running or the like and it is determined that the distance between the data collection device 201 and the relay device 202 becomes larger than the predetermined value, the ProSe functional unit 403 instructs the data collection device 201 to start measuring the signal strength, thereby searching for another relay device.

As described above, this example embodiment can reduce the waste of power consumption by omitting the process of measuring the signal strength between the data collection device 201 and the relay device 202 as needed.

Note that the ProSe functional unit 403 can also control the stop and start of the signal strength measuring process not only by measuring the distance between the data collection device 201 and the relay device 202, but also by estimating the distance to the relay device by the absolute position of the data collection device 201. For example, it is possible to control the stop and start of the signal strength measuring process by using a prepared table 900 as shown in FIG. 9.

For example, the signal strength measuring process is stopped if it is confirmed that the data collection device 201 exists in a predetermined transport vehicle or a predetermined building (a place such as the Shinkansen, a private automobile, or one's house where the relay device certainly exists). That is, if the data collection device 201 exists in a predetermined region or is performing a predetermined movement, the signal strength measurement by the data collection device 201 is interrupted.

Also, if it is determined that the data collection device is not in a predetermined transport vehicle as described above but is moving at a predetermined speed or higher, the signal strength measuring process is started. This is so because it is necessary to search for the relay device.

Third Example Embodiment

An information processing system according to the third example embodiment of the present invention will be explained below with reference to FIG. 10. FIG. 10 is a view for explaining the procedure of the information processing system according to this embodiment. The information processing system according to this embodiment differs from the abovementioned second example embodiment in that the start and stop of signal measurement are determined by using two thresholds. The rest of the arrangement and operation are the same as the second example embodiment, so the same reference numerals denote the same parts and the same processes, and a detailed explanation thereof will be omitted.

In FIG. 10, a ProSe functional unit 403a calculates a device-to-device distance Lm (the distance between a data collection device 201 and a relay device 202) in step S511, and compares the distance Lm with a first threshold Lsh1 in step S1013.

If the device-to-device distance Lm is equal to or larger than the threshold Lsh1, the ProSe functional unit 403a advances to step S1015 to turn on a flag, and instructs the data collection device 201 to start measuring the signal strength from the relay device 202 (step S1017).

If the device-to-device distance Lm is smaller than the Lsh1, the ProSe functional unit 403a advances from step S1013 to step S1019, and determines whether the flag is ON. If the flag is ON, this means that the device-to-device distance Lm has become smaller than the threshold Lsh1 from the state in which the device-to-device distance Lm is equal to or larger than the threshold Lsh1, so the ProSe functional unit 403a compares the device-to-device distance Lm with a second threshold Lsh2 in step S1021.

If the device-to-device distance Lm is smaller than the second threshold Lsh2, the ProSe functional unit 403a turns off the flag in step S1023, and instructs the data collection device 201 to stop measuring the signal strength (step S1025).

On the other hand, if the device-to-device distance Lm is equal to or larger than the second threshold Lsh2 in step S1021, the ProSe functional unit 403a terminates the process without outputting any message (waits until the next position measurement sequence).

By thus performing the processing by using the two thresholds, the control process load can be reduced with respect to the change in device-to-device distance Lm around the first threshold, without frequently controlling the signal strength measurement.

Fourth Example Embodiment

Figure 12:
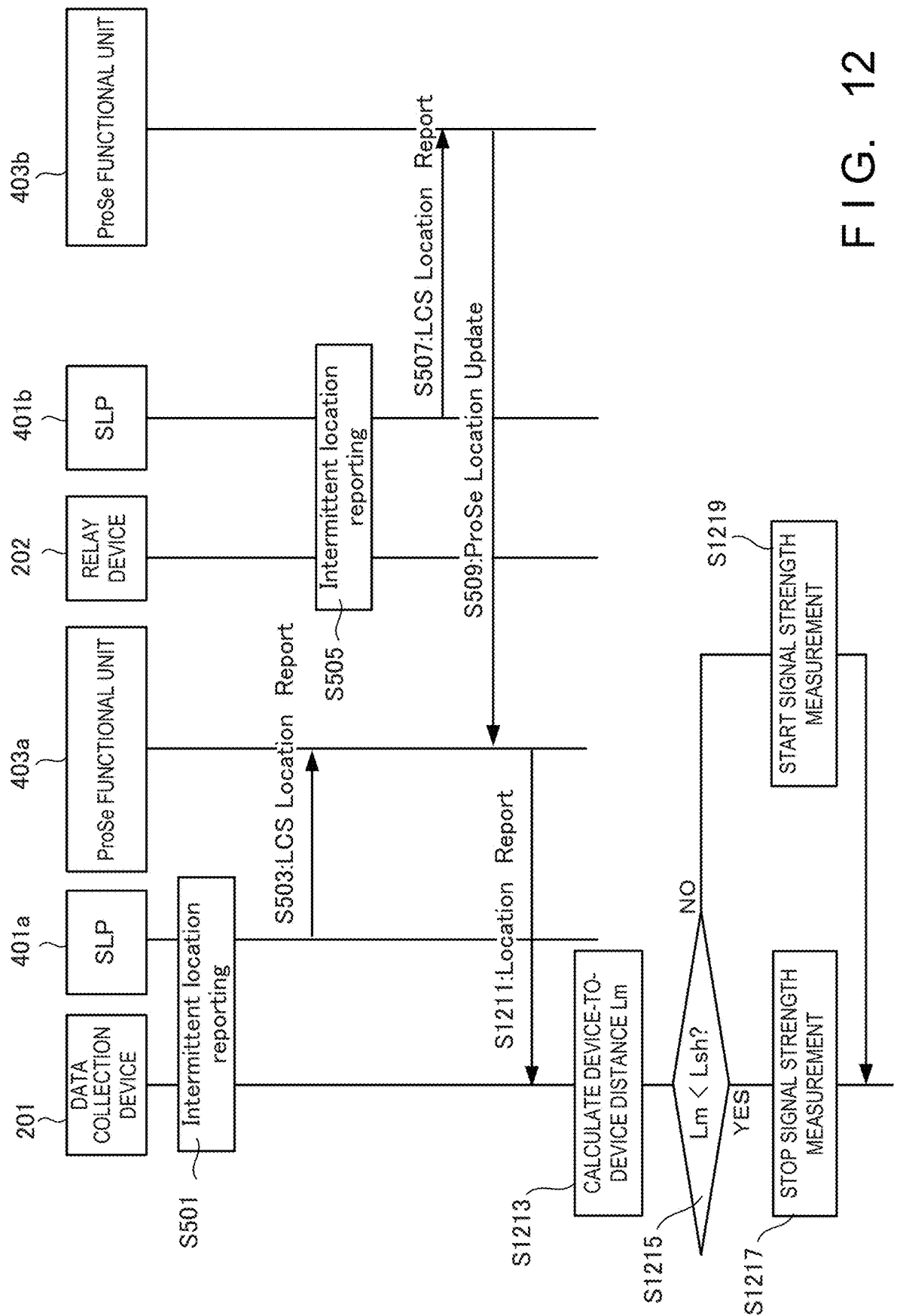
FIG. 12 is a view for explaining the procedure of the information processing system.

An information processing system according to the fourth example embodiment of the present invention will be explained below with reference to FIGS. 11 and 12. FIG. 11 is a view showing the configuration of an information processing system 1100 according to this example embodiment. FIG. 12 is a view for explaining the procedure of the information processing system. The information processing system according to this example embodiment differs from the abovementioned second example embodiment in that a data collection device 201 obtains the position or distance of a relay device 202 and controls the measurement of the signal strength in accordance with the distance. The data collection device 201 obtains the position or distance of the relay device 202 via, e.g., a core apparatus. The rest of the arrangement and operation are the same as the second example embodiment, so the same reference numerals denote the same parts and the same processes, and a detailed explanation thereof will be omitted.

As shown in FIG. 11, a data collection device 1100 includes a position information obtainer 1101 and a controller 1102. The position information obtainer 1101 periodically obtains position information of the data collection device 1100 and position information of a relay device 120.

The controller 1102 controls the measurement of the signal strength between the data collection device 1100 and the relay device 120, based on the position information of the data collection device 1100 and the position information of the relay device 120.

As shown in FIG. 12, in step S1211, a ProSe functional unit 403a transfers the position information of a data collection device 201 and a relay device 202 to the data collection device 201.

In step S1213, the data collection device 201 calculates a device-to-device distance Lm (the distance between the data collection device 201 and the relay device 202). In step S1215, the data collection device 201 compares the distance Lm with a threshold Lsh.

If the device-to-device distance Lm is smaller than the threshold Lsh, the data collection device 201 stops measuring the signal strength from the relay device 202 (step S1217).

If the device-to-device distance Lm is equal to or larger than the threshold Lsh, the data collection device 201 starts measuring the signal strength from the relay device 202 (step S1219).

Since the data collection device 201 determines the device-to-device distance and controls the signal strength measurement as described above, it is possible to perform signal strength measurement control taking account of the status of each data collection device.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)

There is provided an information processing apparatus comprising a position information obtainer that periodically obtains position information of a data collection device, and position information of a relay device that relays communication between the data collection device and a base station, and a controller that controls measurement of a signal strength between the data collection device and the relay device, based on the position information of the data collection device and the position information of the relay device.

(Supplementary Note 2)

There is provided an information processing apparatus described in supplementary note 1, wherein the controller instructs the data collection device to start and interrupt the measurement of the signal strength, in accordance with a distance between the data collection device and the relay device.

(Supplementary Note 3)

There is provided an information processing apparatus described in supplementary note 2, wherein the controller causes the data collection device to interrupt the measurement of the signal strength if the distance between the data collection device and the relay device is not larger than a first predetermined value, and causes the data collection device to start the measurement of the signal strength if the distance between the data collection device and the relay device is larger than the first predetermined value.

(Supplementary Note 4)

There is provided an information processing apparatus described in supplementary note 2, wherein the controller causes the data collection device to interrupt the measurement of the signal strength if the distance between the data collection device and the relay device is not larger than a first predetermined value, and causes the data collection device to start the measurement of the signal strength if the distance between the data collection device and the relay device is larger than a second predetermined value larger than the first predetermined value.

(Supplementary Note 5)

There is provided an information processing apparatus described in any one of supplementary notes 1 to 4, wherein the position information obtainer changes an obtaining interval of the position information, in accordance with the distance between the data collection device and the relay device.

(Supplementary Note 6)

There is provided an information processing apparatus described in supplementary note 1, wherein if the data collection device and the relay device exist in a predetermined region, the controller causes the data collection device to interrupt the measurement of the signal strength.

(Supplementary Note 7)

There is provided an information processing apparatus described in supplementary note 1, wherein if the data collection device and the relay device are performing a predetermined movement, the controller causes the data collection device to interrupt the measurement of the signal strength.

(Supplementary Note 8)

There is provided an information processing method comprising periodically obtaining position information of a data collection device, and position information of a relay device that relays communication between the data collection device and a base station, and controlling measurement of a signal strength between the data collection device and the relay device, based on the position information of the data collection device and the position information of the relay device.

(Supplementary Note 9)

There is provided a non-transitory computer readable medium storing an information processing program for causing a computer to execute a method, comprising periodically obtaining position information of a data collection device, and position information of a relay device that relays communication between the data collection device and a base station; and controlling measurement of a signal strength between the data collection device and the relay device, based on the position information of the data collection device and the position information of the relay device.

(Supplementary Note 10)

There is provided a data collection device comprising a position information obtainer that periodically obtains position information of the data collection device, and position information of a relay device that relays communication between the data collection device and a base station, and a controller that controls measurement of a signal strength between the data collection device and the relay device, based on the position information of the data collection device and the position information of the relay device.

(Supplementary Note 11)

There is provided a data collection device control method comprising periodically obtaining position information of a data collection device, and position information of a relay device that relays communication between the data collection device and a base station, and controlling measurement of a signal strength between the data collection device and the relay device, based on the position information of the data collection device and the position information of the relay device.

(Supplementary Note 12)

There is provided a data collection device control program for causing a computer to execute a method, comprising periodically obtaining position information of a data collection device, and position information of a relay device that relays communication between the data collection device and a base station, and controlling measurement of a signal strength between the data collection device and the relay device, based on the position information of the data collection device and the position information of the relay device.

The invention claimed is:

1. An information processing apparatus comprising:
a position information obtainer that periodically obtains position information of a data collection device, and position information of a relay device that relays communication between said data collection device and a base station; and
a controller that suppresses measurement frequency of a signal strength between said data collection device and said relay device, when said data collection device and said relay device exist at a distance shorter than a predetermined value.

2. The information processing apparatus according to claim 1, wherein said controller instructs said data collection device to start and interrupt the measurement of the signal strength, in accordance with a distance between said data collection device and said relay device.

3. The information processing apparatus according to claim 2, wherein said controller causes said data collection device to interrupt the measurement of the signal strength if the distance between said data collection device and said relay device is not larger than a first predetermined value, and causes said data collection device to start the measurement of the signal strength if the distance between said data collection device and said relay device is larger than the first predetermined value.

4. The information processing apparatus according to claim 2, wherein said controller causes said data collection device to interrupt the measurement of the signal strength if the distance between said data collection device and said relay device is not larger than a first predetermined value, and causes said data collection device to start the measurement of the signal strength if the distance between said data collection device and said relay device is larger than a second predetermined value larger than the first predetermined value.

5. The information processing apparatus according to claim 1, wherein said position information obtainer changes an obtaining interval of the position information, in accordance with the distance between said data collection device and said relay device.

6. The information processing apparatus according to claim 1, wherein if said data collection device and said relay device exist in a predetermined region, said controller causes said data collection device to interrupt the measurement of the signal strength.

7. The information processing apparatus according to claim 1, wherein if said data collection device and said relay device are performing a predetermined movement, said controller causes said data collection device to interrupt the measurement of the signal strength.

8. An information processing method comprising:
periodically obtaining position information of a data collection device, and position information of a relay device that relays communication between said data collection device and a base station; and
suppressing measurement frequency of a signal strength between said data collection device and said relay device, when said data collection device and said relay device exist at a distance shorter than a predetermined value.

9. A data collection device comprising:
a position information obtainer that periodically obtains position information of said data collection device, and position information of a relay device that relays communication between said data collection device and a base station; and
a controller that suppresses measurement frequency of a signal strength between said data collection device and said relay device, when said data collection device and said relay device exist at a distance shorter than a predetermined value.

* * * * *